(Model.)
J. Q. SOOK.
HEN'S NEST.
No. 275,088. Patented Apr. 3, 1883.
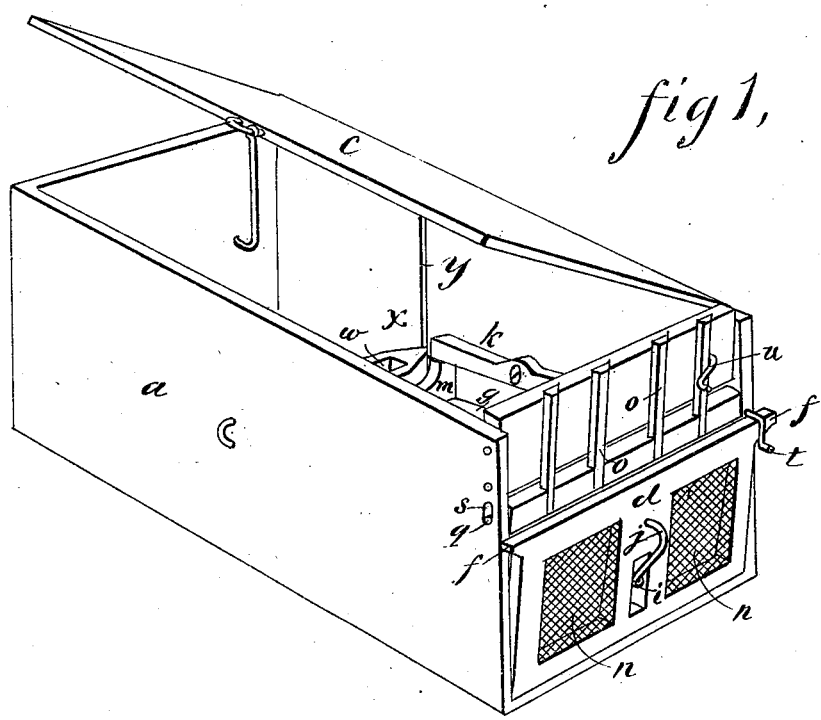
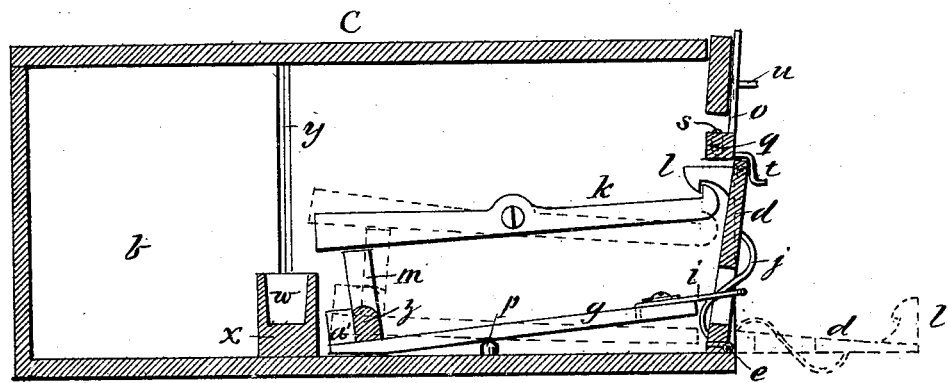
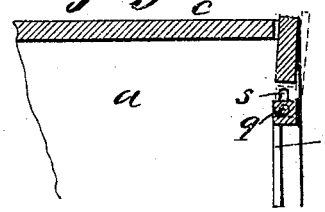
WITNESSES:
Chas. T. Howell
C. Sedgwick
INVENTOR:
J. Q. Sook
BY Munn & Co
ATTORNEYS.

UNITED STATES PATENT OFFICE.

JOSEPH Q. SOOK, OF OLIVET, KANSAS.

HEN'S NEST.

SPECIFICATION forming part of Letters Patent No. 275,088, dated April 3, 1883.

Application filed December 11, 1882. (Model.)

*To all whom it may concern:*

Be it known that I, JOSEPH Q. SOOK, of Olivet, in the county of Osage and State of Kansas, have invented a new and Improved Hen's Nest Box, of which the following is a full, clear, and exact description.

The object of the invention is to make a box in which hens may deposit their eggs, incubate, and hatch their young without disturbance from other fowls or animals.

Reference is to be had to the accompanying drawings, forming part of this specification, in which similar letters of reference indicate corresponding parts in all the figures.

Figure 1 is a perspective view of a coop or box with automatic closing, protecting, and opening apparatus according to my invention. Fig. 2 is a longitudinal sectional elevation of the same, and Fig. 3 is a detail of the apparatus in section.

To any suitable box or coop, $a$, containing a space, $b$, for a nest, and having a hinged cover, $c$, if desired, I provide a door, $d$, at one end on hinges $e$, at the bottom, to swing down and up thereon for opening and closing the entrance and exit for the hen. I prefer to provide the upper edge of the door with extensions $f$ to prevent the door from closing entirely within the exit-space by contact with the ends of the box, in order that the door will open the more readily by the weight of the hen when going off the nest.

Inside of the coop, and between the door and the nest $b$, I arrange a treadle-board, $g$, on pivots $p$, which has connection with the door by a slotted-bar, $i$, and an S-shaped rod, $j$, whereby the weight of the hen on the inner end of the treadle will swing the door up when the hen enters the coop, and said weight will swing the door down when the hen passes onto the outer end of the treadle when going from the nest.

The latch $k$, pivoted to the side of the coop so as to gravitate into the catch $l$ on the door and lock it when the inner end of the handle goes down, is employed for securing the door shut and protecting the hen while on the nest from animals and some insects.

When the hen passes off the nest and tilts up the inner end of the treadle the block $m$ thereon disconnects the latch and allows the door to open. The door is to be provided with ventilating-openings, protected by wire-netting $n$; and for the better protection of the eggs of setting hens I propose to use a falling guard-rack, $o$, to drop in the open space when the hen is out feeding and serve to prevent laying hens from entering to lay in the nests of setting hens, the said rack being sufficient to turn away such hens, who will not strive for entry as the setting hens will.

The rack is mounted on pivots $p$ to swing up and down, as required, and the pivots are fitted in slotted holes $s$ to allow it to rise in case the bars should at any time be caught by the treadle when the latter rises.

When it is desired to fasten the door at the outside a catch, $t$, may be used, and the guard $o$ may be fastened up by a similar catch, $u$.

Between the treadle $g$ and the nest $b$, I propose to place the feed and water cups $w$ for the supply of the hen in the last days of the incubation process and for the newly-hatched chickens, the said cups being formed in or attached to the partition-bar $x$, which is to slide down in the vertical grooves or guides $y$, of any kind, attached to or formed in the sides of the coop, said guides being to confine the cups against being overturned or displaced by the hen, at the same time allowing the cups to be removed readily when required.

Near the inner end of the treadle I arrange a cross-bar, $z$, on which the hens will naturally step in passing along to the nest, so that they will more certainly apply their weight on or near the end of the treadle for greater certainty of action to close the door than they might without it, and for enabling the young chickens to climb up from the space between step $z$ and the partition and cup bar $x$, should they fall therein, I arrange an incline, $a'$, in the space.

It will be readily seen that by the use of the self-protecting coops of this kind much better results will be obtained from the setting hens, and laying hens also will be protected from disturbance while on their nests. Such coops, being made movable for shifting about to the most favorable positions for sunshine and shade, and also being thereby more favorable for cleaning them and destroying insects, will add largely to the health and productions of the hens.

Having thus described my invention, what I claim as new, and desire to secure by Letters Patent, is—

1. In a nest-box for hens, the combination of a slotted bar, $i$, on a treadle, $g$, within the box, with an S-shaped rod, $j$, extending from the inside of door through a slot in the bar and door to a bearing upon the outside of the door, whereby the latter may be actuated by the treadle, as described.

2. The combination, with a treadle, $g$, and a gravity-latch, $k$, the latter arranged in a nest-box above the former, of a vertical block, $m$, arranged on the treadle and under the latch, whereby the latch will be operated as and for the purpose specified.

3. The combination of the guard $o$ with the coop $a$, having automatic door-closing apparatus, substantially as herein set forth, said guard being pivoted in the top of the door-space, substantially as described.

4. The combination, with the coop $a$, having automatic door-closing apparatus, substantially as herein set forth, of the guard $o$, pivoted in the top of the door-space and arranged to rise and fall on its pivot-bearings, substantially as described.

5. The combination of bar $x$, having feed and water cups, with the coop $a$, having nest-chamber $b$, said bar being arranged in vertical guides $y$, substantially as described.

6. The combination of incline $a'$ with step-block $z$ and cup-bar $x$ in incubating apparatus, substantially as described.

JOSEPH QUINCY SOOK.

Witnesses:
CHARLES W. CLAYTON,
LEWIS C. BUSH.